(12) United States Patent
Gerber et al.

(10) Patent No.: US 10,311,299 B2
(45) Date of Patent: Jun. 4, 2019

(54) REFLECTED OPTIC CAMERA MODULE FOR IRIS RECOGNITION IN A COMPUTING DEVICE

(71) Applicant: EyeLock LLC, New York, NY (US)

(72) Inventors: Stephen Charles Gerber, Austin, TX (US); Craig Carroll Sullender, Austin, TX (US)

(73) Assignee: Eyelock LLC, New York, NY (US)

( * ) Notice: Subject to any disclaimer, the term of this patent is extended or adjusted under 35 U.S.C. 154(b) by 0 days.

(21) Appl. No.: 15/385,018

(22) Filed: Dec. 20, 2016

(65) Prior Publication Data

US 2017/0177936 A1 Jun. 22, 2017

Related U.S. Application Data

(60) Provisional application No. 62/270,149, filed on Dec. 21, 2015.

(51) Int. Cl.
*G06K 9/00* (2006.01)
*H04N 5/225* (2006.01)
(Continued)

(52) U.S. Cl.
CPC ......... *G06K 9/00617* (2013.01); *G06F 21/32* (2013.01); *G06K 9/00604* (2013.01);
(Continued)

(58) Field of Classification Search
None
See application file for complete search history.

(56) References Cited

U.S. PATENT DOCUMENTS 4,641,349 A 2/1987 Flom et al.
5,259,040 A 11/1993 Hanna
(Continued)

FOREIGN PATENT DOCUMENTS

JP 2008-204394 9/2007
KR 20-0340278 1/2004
(Continued)

OTHER PUBLICATIONS

International Search Report and Written Opinion on PCT/US2016/067761 dated Apr. 10, 2017.
(Continued)

*Primary Examiner* — Ryan P Potts
(74) *Attorney, Agent, or Firm* — Foley & Lardner LLP

(57) ABSTRACT

Described embodiments include systems and methods for acquiring iris biometric data. An optical entrance of an optical medium may receive a ray incident on the optical entrance, the ray comprising biometric data. An interface of the optical medium with a second medium may receive the received ray at a first angle greater than a critical angle of the interface to enable total internal reflection of the received incident ray. A reflective coating, prism or other mechanism may be used in place of the interface to redirect the received ray or bend the optical path of the received ray. An optical exit of the optical medium may couple the reflected or redirected ray to a sensor for acquiring the biometric data. The ray may be incident on the optical entrance at a second angle relative to an axis of the sensor that is less than 90 degrees.

20 Claims, 11 Drawing Sheets

Camera Module may be mounted flat on PCB inside Computing Device case.
Camera lens may be aimed at user to receive incident ray.

(51) Int. Cl.
*G06F 21/32* (2013.01)
*H04N 5/232* (2006.01)

(52) U.S. Cl.
CPC ........ *H04N 5/2254* (2013.01); *H04N 5/2257* (2013.01); *H04N 5/23219* (2013.01); *H04N 5/2253* (2013.01)

(56) References Cited

U.S. PATENT DOCUMENTS

| | | | |
|---|---|---|---|
| 5,291,560 A | 3/1994 | Daugman | |
| 5,488,675 A | 1/1996 | Hanna | |
| 5,572,596 A | 11/1996 | Wildes et al. | |
| 5,581,629 A | 12/1996 | Hanna et al. | |
| 5,613,012 A | 3/1997 | Hoffman et al. | |
| 5,615,277 A | 3/1997 | Hoffman | |
| 5,737,439 A | 4/1998 | Lapsley et al. | |
| 5,764,789 A | 6/1998 | Pare et al. | |
| 5,802,199 A | 9/1998 | Pare et al. | |
| 5,805,719 A | 9/1998 | Pare et al. | |
| 5,838,812 A | 11/1998 | Pare et al. | |
| 5,901,238 A | 5/1999 | Matsushita | |
| 5,953,440 A | 9/1999 | Zhang et al. | |
| 5,978,494 A | 11/1999 | Zhang | |
| 6,021,210 A | 2/2000 | Camus et al. | |
| 6,028,949 A | 2/2000 | McKendall | |
| 6,064,752 A | 5/2000 | Rozmus et al. | |
| 6,069,967 A | 5/2000 | Rozmus et al. | |
| 6,144,754 A | 11/2000 | Okano et al. | |
| 6,192,142 B1 | 2/2001 | Pare et al. | |
| 6,247,813 B1 | 6/2001 | Kim et al. | |
| 6,252,977 B1 | 6/2001 | Salganicoff et al. | |
| 6,289,113 B1 | 9/2001 | McHugh et al. | |
| 6,366,682 B1 | 4/2002 | Hoffman et al. | |
| 6,373,968 B2 | 4/2002 | Okano et al. | |
| 6,377,699 B1 | 4/2002 | Musgrave et al. | |
| 6,424,727 B1 | 7/2002 | Musgrave et al. | |
| 6,483,930 B1 | 11/2002 | Musgrave et al. | |
| 6,532,298 B1 | 3/2003 | Cambier et al. | |
| 6,542,624 B1 | 4/2003 | Oda | |
| 6,546,121 B1 | 4/2003 | Oda | |
| 6,594,376 B2 | 7/2003 | Hoffman et al. | |
| 6,594,377 B1 | 7/2003 | Kim et al. | |
| 6,652,099 B2 | 11/2003 | Chae et al. | |
| 6,700,998 B1 | 3/2004 | Murata | |
| 6,714,665 B1 | 3/2004 | Hanna et al. | |
| 6,760,467 B1 | 7/2004 | Min et al. | |
| 6,850,631 B1 | 2/2005 | Oda et al. | |
| 6,917,695 B2 | 7/2005 | Teng et al. | |
| 6,980,670 B1 | 12/2005 | Hoffman et al. | |
| 6,985,608 B2 | 1/2006 | Hoffman et al. | |
| 7,095,901 B2 | 8/2006 | Lee et al. | |
| 7,146,027 B2 | 12/2006 | Kim et al. | |
| 7,248,719 B2 | 7/2007 | Hoffman et al. | |
| 7,271,939 B2 | 9/2007 | Kono | |
| 7,385,626 B2 | 6/2008 | Aggarwal et al. | |
| 7,414,737 B2 | 8/2008 | Cottard et al. | |
| 7,418,115 B2 | 8/2008 | Northcott et al. | |
| 7,428,320 B2 | 9/2008 | Northcott et al. | |
| 7,542,590 B1 | 6/2009 | Robinson et al. | |
| 7,558,406 B1 | 7/2009 | Robinson et al. | |
| 7,558,407 B2 | 7/2009 | Hoffman et al. | |
| 7,574,021 B2 | 8/2009 | Matey | |
| 7,583,822 B2 | 9/2009 | Guillemot et al. | |
| 7,606,401 B2 | 10/2009 | Hoffman et al. | |
| 7,616,788 B2 | 11/2009 | Hsieh et al. | |
| 7,639,840 B2 | 12/2009 | Hanna et al. | |
| 7,693,307 B2 | 4/2010 | Rieul et al. | |
| 7,697,786 B2 | 4/2010 | Camus et al. | |
| 7,715,595 B2 | 5/2010 | Kim et al. | |
| 7,719,566 B2 | 5/2010 | Guichard | |
| 7,797,606 B2 | 9/2010 | Chabanne | |
| 7,869,627 B2 | 1/2011 | Northcott et al. | |
| 7,929,732 B2 | 4/2011 | Bringer et al. | |
| 7,978,883 B2 | 7/2011 | Rouh et al. | |
| 8,009,876 B2 | 8/2011 | Kim et al. | |
| 8,025,399 B2 | 9/2011 | Northcott et al. | |
| 8,092,021 B1 | 1/2012 | Northcott et al. | |
| 8,132,912 B1 | 3/2012 | Northcott et al. | |
| 8,170,295 B2 | 5/2012 | Fujii et al. | |
| 8,233,680 B2 | 7/2012 | Bringer et al. | |
| 8,243,133 B1 | 8/2012 | Northcott et al. | |
| 8,279,042 B2 | 10/2012 | Beenau et al. | |
| 8,317,325 B2 | 11/2012 | Raguin et al. | |
| 8,494,229 B2* | 7/2013 | Jarvenpaa | G06F 3/013 351/206 |
| 8,811,690 B2 | 8/2014 | Dumont et al. | |
| 8,913,119 B2* | 12/2014 | Choi | A61B 5/0077 348/78 |
| 2002/0158750 A1 | 10/2002 | Almalik | |
| 2005/0084137 A1 | 4/2005 | Kim et al. | |
| 2006/0074986 A1 | 4/2006 | Mallalieu et al. | |
| 2006/0140454 A1* | 6/2006 | Northcott | A61B 5/1171 382/117 |
| 2007/0211922 A1 | 9/2007 | Crowley et al. | |
| 2008/0002863 A1* | 1/2008 | Northcott | A61B 3/1216 382/117 |
| 2009/0074256 A1 | 3/2009 | Haddad | |
| 2009/0097715 A1 | 4/2009 | Cottard et al. | |
| 2009/0161925 A1 | 6/2009 | Cottard et al. | |
| 2009/0231096 A1 | 9/2009 | Bringer et al. | |
| 2010/0007935 A1* | 1/2010 | Nishikawa | G02B 26/0841 359/205.1 |
| 2010/0021016 A1 | 1/2010 | Cottard et al. | |
| 2010/0074477 A1 | 3/2010 | Fujii et al. | |
| 2010/0127826 A1 | 5/2010 | Saliba et al. | |
| 2010/0246903 A1 | 9/2010 | Cottard | |
| 2010/0278394 A1 | 11/2010 | Raguin et al. | |
| 2010/0310070 A1 | 12/2010 | Bringer et al. | |
| 2011/0158486 A1 | 6/2011 | Bringer et al. | |
| 2011/0194738 A1 | 8/2011 | Choi et al. | |
| 2011/0222745 A1* | 9/2011 | Osterhout | G02B 27/017 382/118 |
| 2011/0277518 A1 | 11/2011 | Lais et al. | |
| 2012/0240223 A1 | 9/2012 | Tu | |
| 2012/0257797 A1 | 10/2012 | Leyvand et al. | |
| 2014/0071400 A1 | 3/2014 | Gao | |
| 2015/0241966 A1* | 8/2015 | Nortrup | G06F 3/012 345/156 |

FOREIGN PATENT DOCUMENTS

| | | |
|---|---|---|
| WO | WO-2010/062371 | 6/2010 |
| WO | WO-2011/093538 | 8/2011 |

OTHER PUBLICATIONS

B. Galvin, et al., Recovering Motion Fields: An Evaluation of Eight Optical Flow Algorithms, Proc. of the British Machine Vision Conf. (1998).
J. R. Bergen, et al., Hierarchical Model-Based Motion Estimation, European Conf. on Computer Vision (1993).
K. Nishino, et al., The World in an Eye, IEEE Conf. on Pattern Recognition, vol. 1, at pp. 444-451 (Jun. 2004).
R. Kumar, et al., Direct recovery of shape from multiple views: a parallax based approach, 12th IAPR Int'l Conf. on Pattern Recognition (1994).

\* cited by examiner

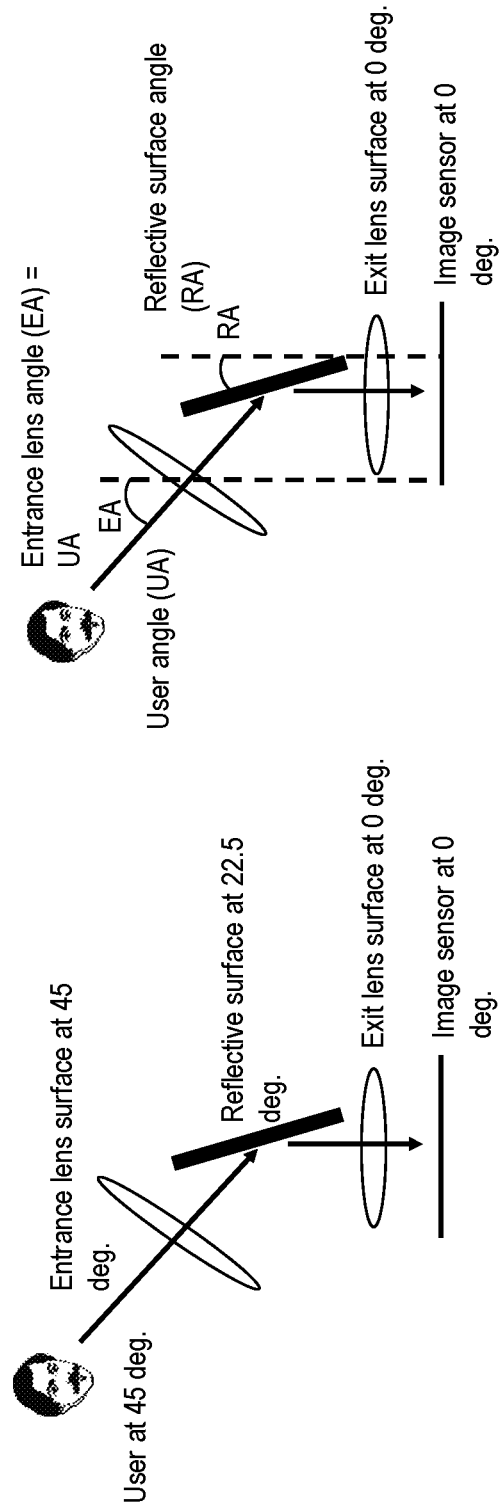

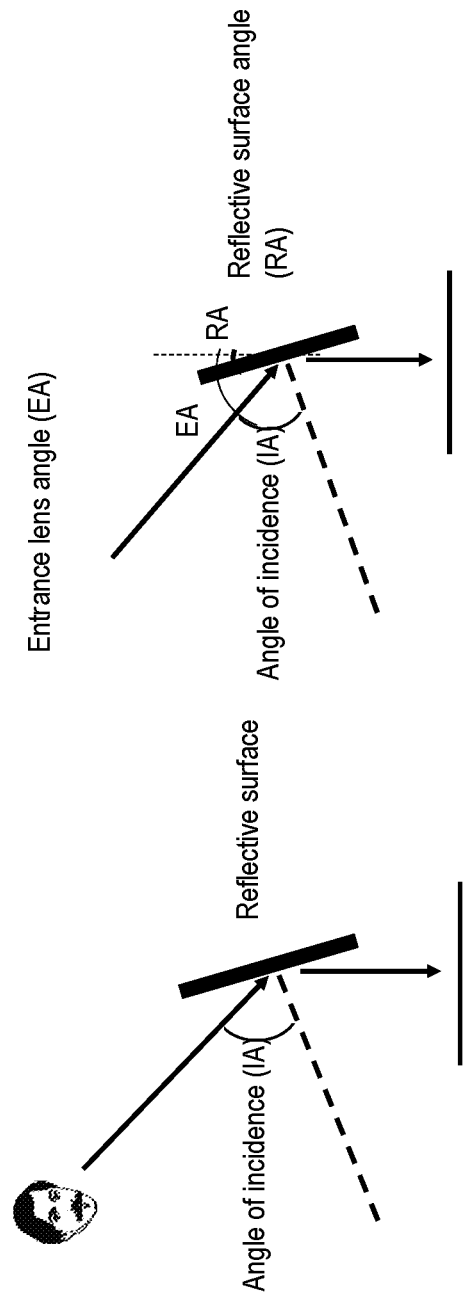

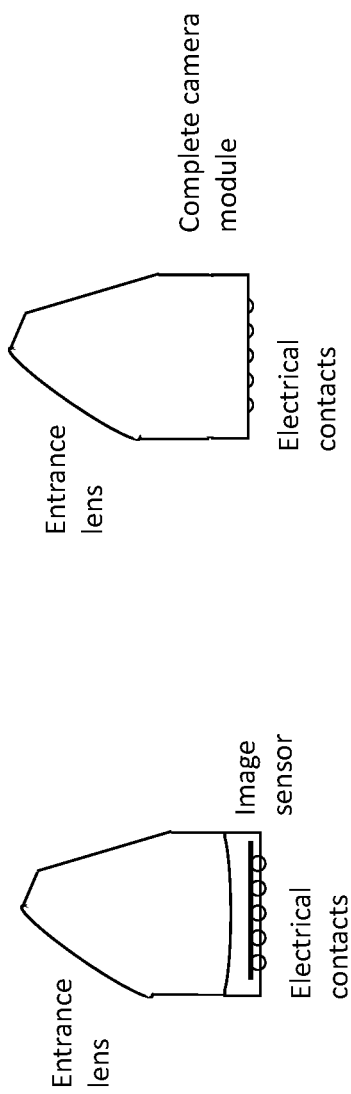

REFLECTED OPTIC CAMERA MODULE FOR IRIS RECOGNITION IN A COMPUTING DEVICE

CROSS REFERENCE TO RELATED APPLICATIONS

This application claims the benefit of and priority to U.S. Provisional Application Ser. No. 62/270,149, filed Dec. 21, 2015, entitled "REFLECTED OPTIC CAMERA MODULE FOR IRIS RECOGNITION IN A COMPUTING DEVICE". The entire content of the foregoing is incorporated herein by reference for all purposes.

FIELD OF THE DISCLOSURE

This disclosure generally relates to systems and methods for biometric acquisition, including but not limited to systems and methods for acquiring a biometric feature oriented at an angle to a computing device.

BACKGROUND

The diversity and number of computing devices is increasing exponentially. For example, there are portable devices such as laptops and tablets, and traditional desk-bound computing platforms. Some of these devices may include mounted cameras, but these cameras are typically unsuitable for acquiring iris biometric data for authentication purposes.

SUMMARY

Some embodiments of the present invention relate generally to apparatuses, systems and methods for acquiring a biometric feature oriented at an angle to a computing device are provided. Some embodiments of the present systems and methods use a reflected optic camera module for iris recognition, incorporated in a computing device. The reflected optic camera module may support an optical path for light rays incident from a user (e.g., an iris of the user) that enter the camera module, such that the light rays are redirected to an image sensor mounted at an angle from the incident light rays. For instance, and in some embodiments, the reflected optic camera module is manufactured as a solid piece of acrylic glass with an entrance surface for incident rays to enter, a reflective surface for total internal reflection of the entered rays, and an exit surface for coupling the reflected rays to an image sensor.

In some aspects, the present disclosure is directed to a system for acquiring biometric data from an iris oriented at an angle to a computing device. The system may include a sensor of an iris biometric camera mounted on a computing device. An optical entrance of an optical medium of the iris biometric camera may be configured to receive light reflected off an iris and incident on the optical entrance at a first angle relative to an optical axis of the sensor that is greater than zero degree and less than 90 degrees. The received light may include an iris biometric data for biometric matching. An interface between the optical medium and a second medium may be configured so that the received light is incident at a second angle greater than a critical angle of the interface to cause total internal reflection of the received light within the optical medium. An optical exit of the optical medium may be configured to couple the total internally reflected light to the sensor for acquiring the iris biometric data.

In some embodiments, the optical entrance is oriented towards an expected gaze direction of a subject using the computing device. The sensor may be mounted on a circuit board of the computing device and oriented away from the expected gaze direction. The iris biometric camera may be integrated with a keyboard or an input pad of the computing device. The optical medium may correspond to a monolithic piece of material with a predetermined refractive index. The second medium may comprise air or a vacuum.

In certain embodiments, a plane of the interface is at an angle of less than 45 degrees relative to the optical axis of the sensor. At least one of the optical entrance or the optical exit may incorporate a lens structure. The sensor may be configured to acquire the iris biometric data for biometric matching to provide access control to a corresponding subject.

In certain aspects, the present disclosure is directed to a method for acquiring biometric data from an iris oriented at an angle to a computing device. The method may include receiving, via an optical entrance of an optical medium of an iris biometric camera mounted on a computing device, light reflected off an iris and incident on the optical entrance at a first angle relative to an optical axis of a sensor that is greater than zero degree and less than 90 degrees. The received light may include iris biometric data for biometric matching. An interface between the optical medium and a second medium may cause total internal reflection of the received light within the optical medium. The received light may be incident at a second angle greater than a critical angle of the interface. An optical exit of the optical medium may couple the total internally reflected light to the sensor for acquiring the iris biometric data.

In some embodiments, the method may include positioning the optical entrance to be oriented towards an expected gaze direction of a subject using the computing device. The sensor may be oriented away from the expected gaze direction. The iris biometric camera may be integrated with a keyboard or an input pad of the computing device. The optical medium may correspond to a monolithic piece of material with a predetermined refractive index, and the second medium comprises air or a vacuum. A plane of the interface may be at an angle of less than 45 degrees relative to the optical axis of the sensor. The sensor may acquire the iris biometric data for biometric matching to provide access control to a corresponding subject.

In certain aspects, the present disclosure is directed to a system for acquiring biometric data from an iris oriented at an angle to a computing device. The system may include a sensor of an iris biometric camera mounted on a computing device. An optical entrance of an iris biometric camera may be configured to receive light reflected off an iris and incident on the optical entrance at a first angle relative to an optical axis of the sensor that is greater than zero degree and less than 90 degrees. The received light may include iris biometric data for biometric matching. Redirection optics of the iris biometric camera may be configured to alter the path of the received light towards the sensor. An optical exit of the iris biometric camera may be configured to couple the light from the redirection optics to the sensor for acquiring the iris biometric data.

In some embodiments, the optical entrance is oriented towards an expected gaze direction of a subject using the computing device. The sensor may be mounted in the computing device and oriented away from the expected gaze direction. The iris biometric camera may be integrated with a keyboard or an input pad of the computing device. The redirection optics may incorporate at least one of a reflecting surface or a prism. At least one of the optical entrance or the optical exit may comprise a lens. In certain embodiments, the sensor is configured to acquire the iris biometric data for biometric matching to provide access control to a corresponding subject.

In some aspects, the present disclosure describes systems and methods for acquiring a biometric feature oriented at an angle to a computing device. An optical entrance of an optical medium may receive a ray incident on the optical entrance, the ray comprising biometric data of a subject. An interface of the optical medium with a second medium may receive the received ray at a first angle greater than a critical angle of the interface to enable total internal reflection of the received incident ray. An optical exit of the optical medium may couple the total internally reflected ray to a sensor for acquiring the biometric data from the total internally reflected ray. The ray may be incident on the optical entrance at a second angle relative to an axis of the sensor that is less than 90 degrees.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan would understand that the drawings primarily are for illustration purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2H and 2I depict embodiments of a system using a reflected optic camera module.

FIG. 2J illustrates an angle of incidence in a system using a reflected optic camera module, according to some embodiments;

FIG. 2K depicts a system using a reflected optic camera module, according to some embodiments;

FIGS. 2N and 2O depict different view of an embodiment of a camera module; and

DETAILED DESCRIPTION

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods using a reflected optic camera module.

A. Network and Computing Environment

Figure 1A:
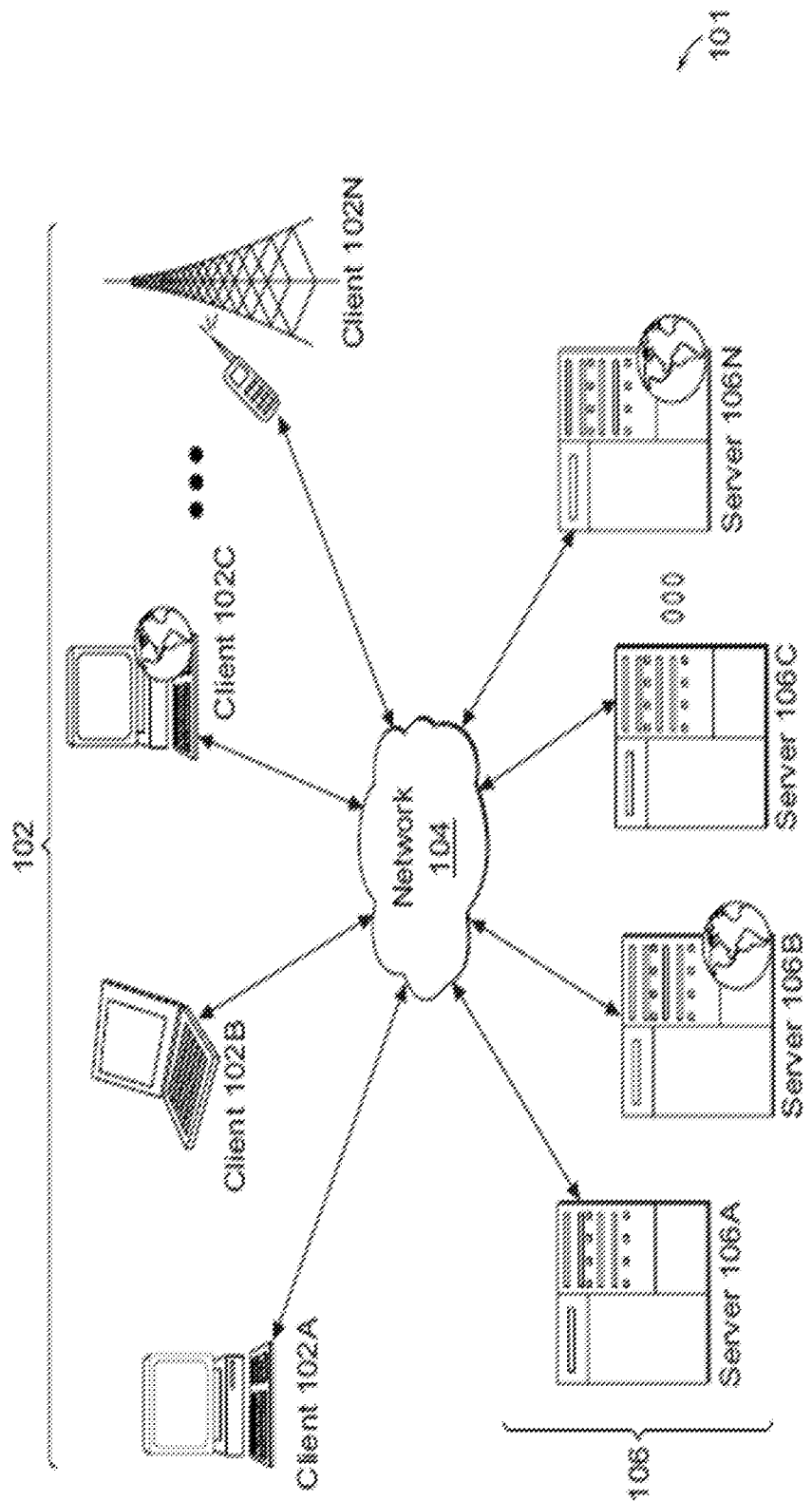
FIG. 1A is a block diagram illustrative of an embodiment of a networked environment with a client machine that communicates with a server.

Before addressing specific embodiments of the present solution, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network 104.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser;

a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
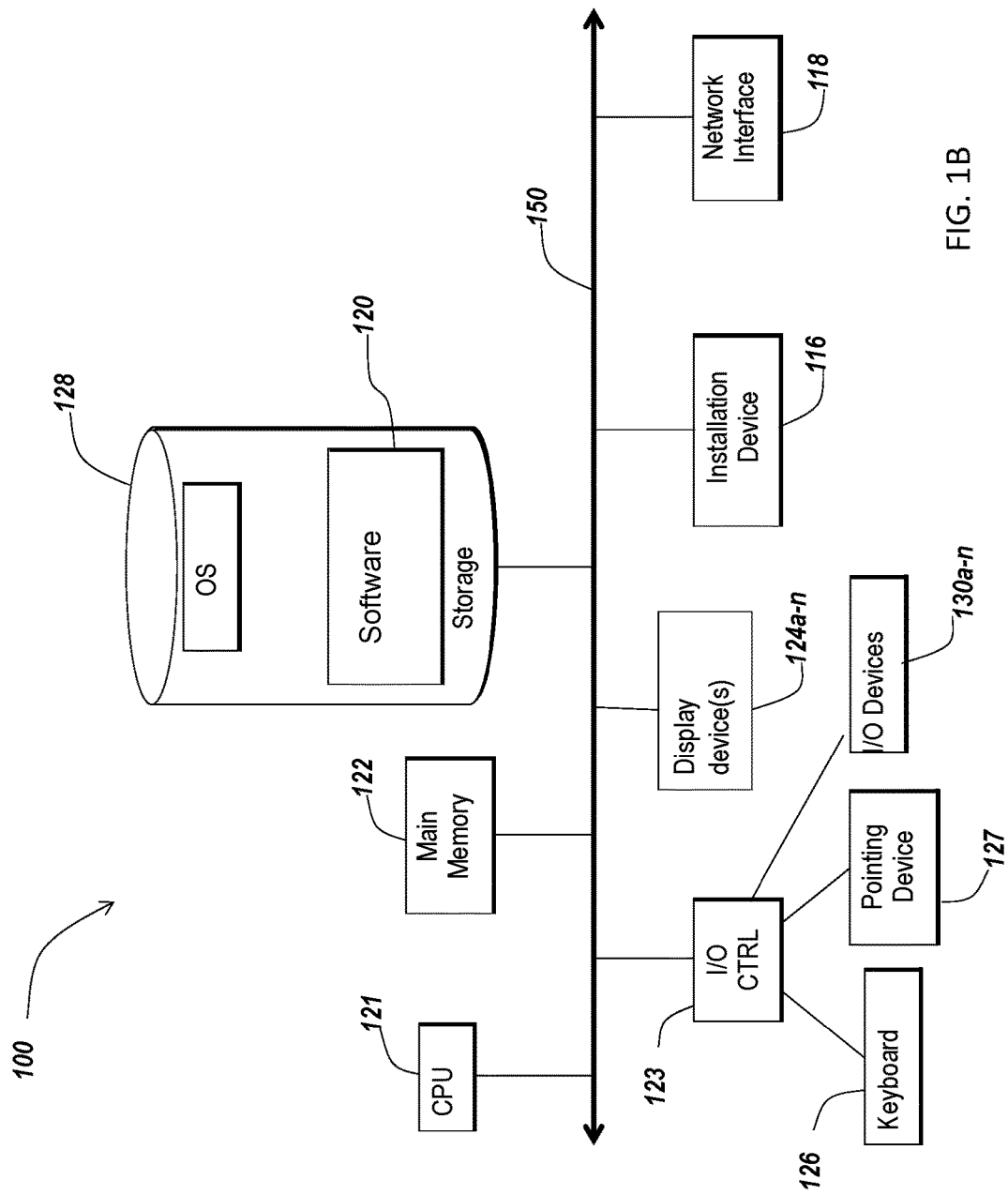
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, and software 120. The I/O controller 123, in some embodiments, is further connected to a key board 126, and a pointing device 127. Other embodiments may include an I/O controller 123 connected to more than one input/output device 130A-130N.

Figure 1C:
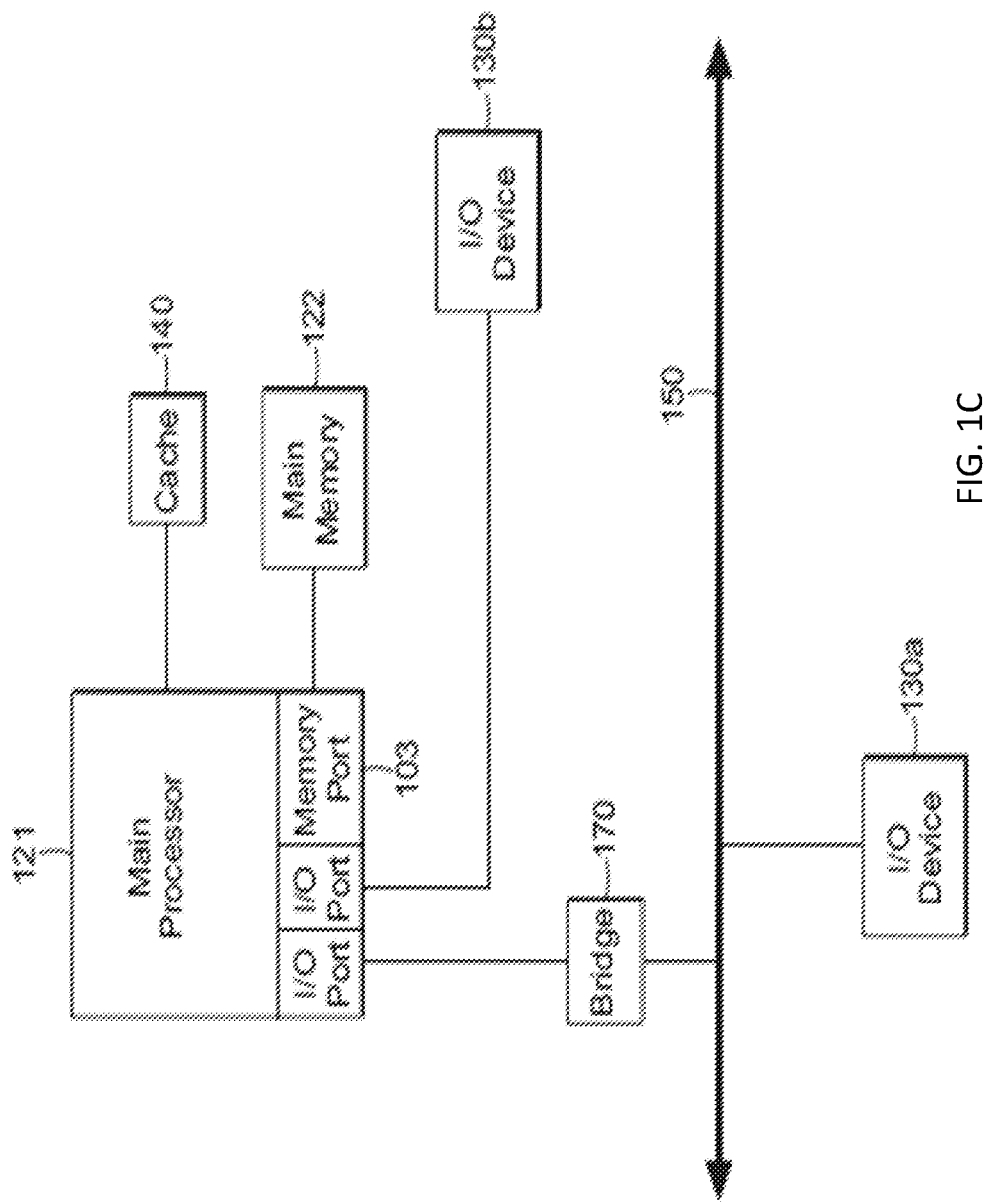

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

The computing device 100 can include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Reflected Optic Camera Module

According to some embodiments, systems and methods for acquiring a biometric feature oriented at an angle to a computing device are provided. Some embodiments of the present systems and methods use a reflected optic camera module for iris recognition, incorporated in a computing device. The reflected optic camera module may support an optical path for light rays incident from a user (e.g., an iris of the user) that enter the camera module, such that the light rays are redirected to an image sensor mounted at an angle from the incident light rays. For instance, and in some embodiments, the reflected optic camera module is manufactured as a solid piece of acrylic glass with an entrance surface for incident rays to enter, a reflective surface for total internal reflection of the entered rays, and an exit surface for coupling the reflected rays to an image sensor.

Figures 2A, 2B:
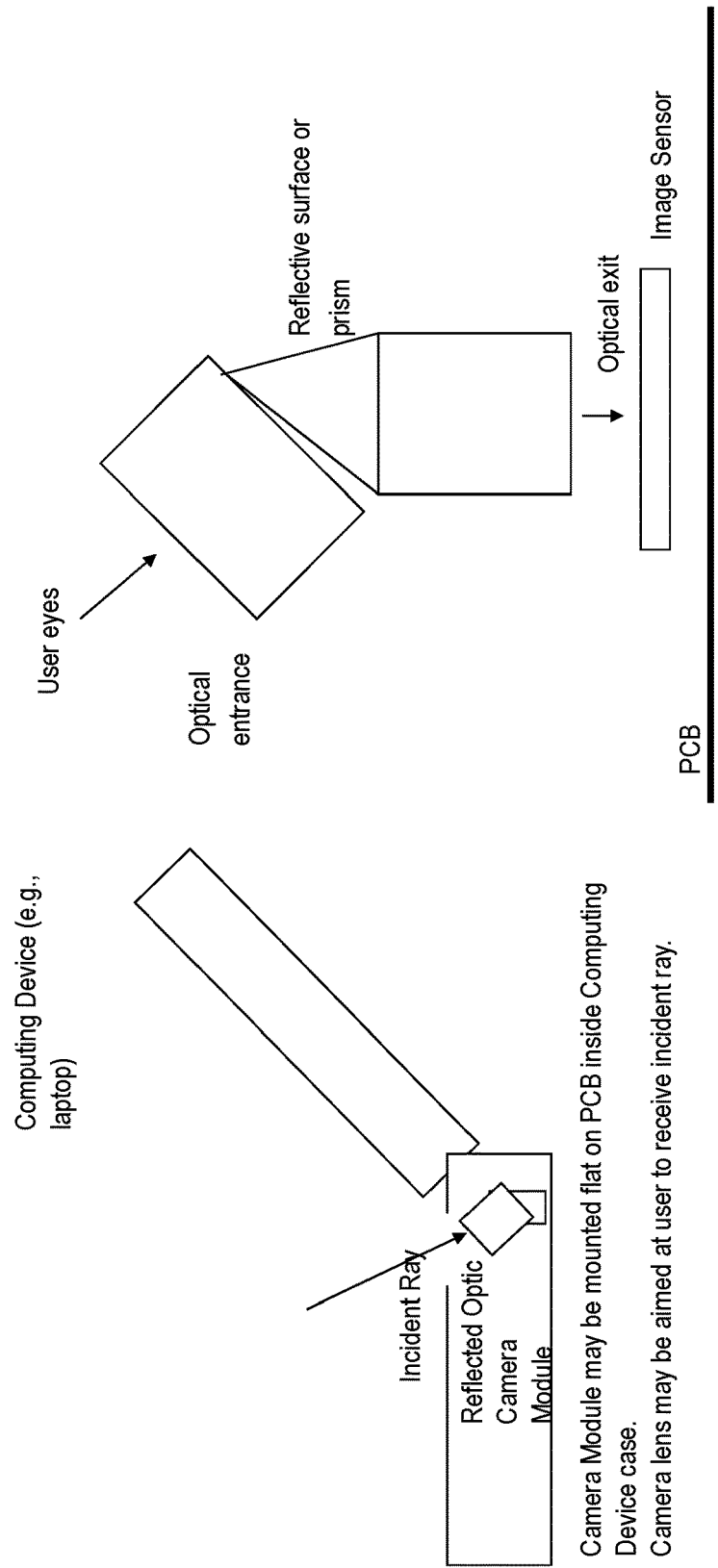
FIGS. 2A and 2B are diagrams illustrating a system for acquiring biometric data from an iris oriented at an angle, according to some embodiments.

Referring to FIG. 2A, one embodiment of a system for acquiring a biometric feature oriented at an angle is depicted. In brief overview, the system may include a computing device and/or a reflected optic camera module mounted onto the computing device. The computing device may include any embodiment of the computing devices referenced above in connection with FIGS. 1A-1C. By way of illustration, and not intended to be limiting in any way, the computing devices may include devices such as computers (e.g., laptops, netbooks, desktop computers), tablets and hybrid devices (e.g., with keyboard and/or other separable or attached subcomponents), printers or office equipment (e.g., multi-function printers, photocopiers, scanners), keyboards or other input devices, docking stations (e.g., for certain computing devices), medical devices (e.g., with electronic components), lottery sales terminals or devices, cash registers or other transaction devices, automated teller machine (ATM) or other banking terminals or devices, security or authentication terminals, control panels or dashboards, and casino gaming equipment. The reflected optic camera module may include an optical entrance (e.g., an entrance lens/surface), a reflective surface or prism component (e.g., a mirrored surface), an optical exit (e.g., an exit lens/ surface), and/or an image sensor coupled to the optical exit, an example embodiment of which is depicted in FIG. 2B. The image sensor may be aligned with and/or connected to a printed circuit board (PCB) of the computing device.

In some embodiments, a camera module refers to a device comprising one or more camera lenses, a reflective component, an image sensor, and/or a case or body that contains the one or more lenses and the image sensor. In certain embodiments, a reflected optic camera module provides an optical path (e.g., through its one or more lenses) that is not a straight line, but is angled (e.g., by a surface) so that an optical entrance of the camera module can point in a different direction than the image sensor. Such a reflected optic camera module can align with location(s) and/or direction(s) of a user' eye(s), relative to the computing device's orientation.

For example, typical straight optics of other camera modules can make it difficult to mount such a camera module on a circuit board of a computing device in any direction other than 0 and 90 degrees relative to the surface of the computing device's circuit board. Moreover, a user typically faces the user's computing device (e.g., computer) at an angle other than 0 or 90 degrees from a main surface (e.g., a keyboard) of the computing device, the main surface being typically parallel to the circuit board. In such cases, the adjustability of camera module optical path for different mounting locations can be limited. Changing the orientation of camera modules built with typical straight optics can require special mounting operations during manufacturing, which may increase cost and opportunity for error. Typical straight optics can make camera modules too large to fit into computer industrial designs (into a computer chassis, for instance). In some embodiments, mirrors can be utilized to achieve non-straight optics. However the use of mirrors can be expensive. In comparison, incident angles of roughly 42 degrees or more can provide total internal reflection and can eliminate the need for reflective coatings or mirrors.

In some embodiments, the present systems and methods allow an iris recognition device (camera module) to be mounted on a circuit board of a computing device (e.g., on the main PCB near/under the keyboard of a laptop computer, directly on the main CPU board). An image sensor of a camera module is typically mounted to the circuit board surface, in one or more embodiments. In certain embodiments, the reflected optic camera module has an optical lens and a reflective surface interposed in the optical path of the lens so that the lens' opening towards the subject (optical entrance) is not in a straight line with a lens opening towards the image sensor (optical exit). For example, one lens opening (optical entrance) may be at an angle (e.g. 45 degrees) from the other lens opening (optical exit). A subject viewed by the camera, and a corresponding incident ray, can be aligned with or in line (0 degree) to the lens entrance. The optical path can eventually connect with, or enter the image sensor at a perpendicular axis. Thus, the reflective optic of the camera module can allow the subject to be located at an angle relative to the image sensor.

In some embodiments, the reflective surface or component (and corresponding reflective angle) of the reflected optic camera module is set during lens manufacturing. The reflective component may comprise a prism, mirror, surfaced lens element or surface that uses total internal reflection, and no mirrored coating for example.

By way of background and in some embodiments, iris recognition may be used to protect computing devices from unwanted or unauthorized users. For example, iris recognition can be set up to allow only the owner of a laptop to operate the laptop. Iris recognition may use a camera to capture one or more images of the user's eyes. The camera should be pointed towards the user's face or eyes, in order to capture biometric data for iris recognition. Computing devices frequently have no internal mounting options for such a camera. For example, a laptop display bezel is too thin to contain such a camera suitable for iris biometric acquisition. Such a camera, if mounted on a main PCB of a laptop would point straight up, away from the user.

Figure 2D:
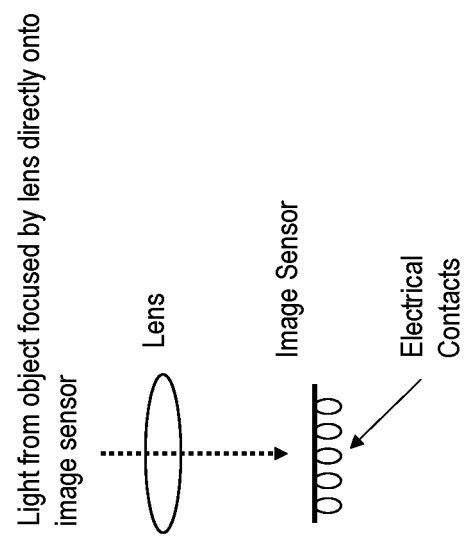
FIGS. 2D-2G depict a camera module that has a lens and an image sensor arranged so that the optical path is a straight line, according to some embodiments.
Figure 2C:
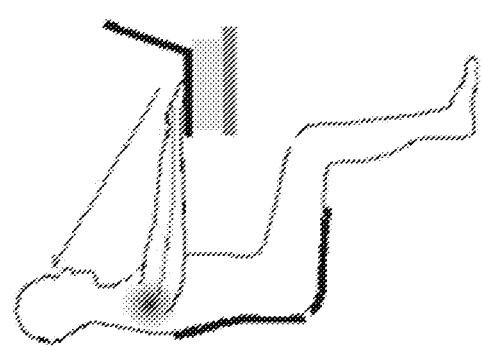
FIG. 2C depicts one example embodiment of a system using a reflected optic camera module.

FIG. 2C depicts one example embodiment of a system using a reflected optic camera module. A user's eyes or gaze are at an angle to a corresponding computing device. As such, the user's face and/or eyes may be at an angle relative to a surface of keyboard. The surface of the keyboard is at the same orientation as the main PCB of laptop assembly, in one or more embodiments. As discussed in connection with FIGS. 2A-2B, embodiments of the present system use reflected optics to bend the optical light path so that the camera module can capture an image of a user at an angle to the computing device. The camera module using reflected optics may be mounted on a main PCB of the computing device (e.g., a laptop). The camera module is able to capture images of the user's face and/or eye(s). Embodiments of the present system allow an adjustable angle between the computing device and the user's face. The camera module can be mounted in the computing device with the imaging angle set exactly as required by the computing device's user interface design. The present system can provide a convenient and/or cost-effective solution to mounting a camera in a computing device that can capture images of the user's face and/or eye(s).

Figure 2G:
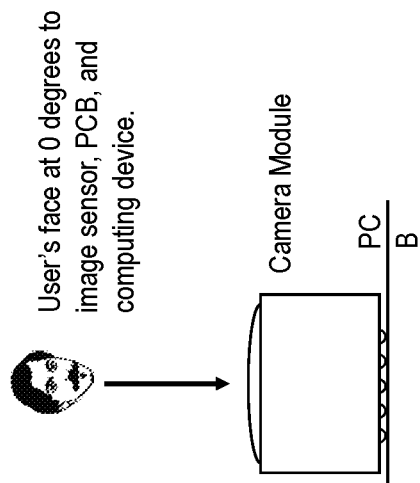
Figure 2F:
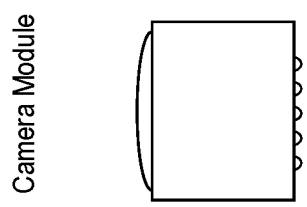
Figure 2E:
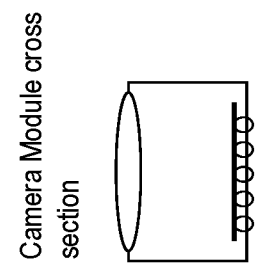

FIGS. 2D-2G depict a camera module that has a lens and an image sensor arranged so that the optical path is a straight line, in contrast with the reflected optic camera module discussed above. With a camera module having a straight line optical path, an object to be imaged has to be positioned and oriented to be 0 degrees relative to the image sensor's facing direction, as depicted in FIGS. 2D and 2G. FIG. 2D, for instance, depicts a typical arrangement of a lens and image sensor with a straight line optical path, and having electrical contact of the image sensor that connect with a PCB of a computing device on which the sensor is mounted. FIG. 2E depicts components (lens and image sensor) in a cross sectional view of a camera module having a straight line optical path. FIG. 2F depicts a corresponding embodiment of a camera module having a straight line optical path. FIG. 2G shows that a camera module having a straight line optical path may only capture an image of an object oriented at 0 degrees relative to a perpendicular axis of the PCB (and of the laptop keyboard surface, for instance). Capturing an image of a user, say at 45 degrees relative to the keyboard surface for example, would require mounting such a camera module at an angle (i.e., 45 degrees) relative to the PCB, which is complicated and costly.

FIG. 2H depicts one embodiment of a system using a reflected optic camera module. In the depicted example, a reflected optic camera module captures an image of a user at an adjustable angle to the image sensor. The example shows the user at 45 degrees relative to the vertical, the entrance lens at 45 degrees relative to the vertical, the reflective portion of the module at 22.5 degrees relative to the vertical, the exit lens at 0 degree relative to the vertical, and the image sensor facing up at 0 degree relative to the vertical.

FIG. 2I depicts an embodiment of a system using a reflected optic camera module. As depicted, a reflected optic camera module captures an image of a user at an adjustable angle to the image sensor. FIG. 2I more generally shows the user at an entrance angle (EA) or user angle (UA) relative to the vertical, the reflective portion of the module at a reflective surface angle (RA) of EA/2 or UA/2 degrees relative to the vertical, the exit lens at 0 degree relative to the vertical, and the image sensor facing up at 0 degree relative to the vertical. Some design parameters of the adjustable reflected optic camera module may be represented in some embodiments as:

Entrance lens angle=User angle

EA=UA

Reflective surface angle=(Entrance lens angle/2)

RA=(EA/2)

or

Reflective surface angle=(User angle/2)

RA=(UA/2)

Because manufacturing a lens with a reflective coating adds cost, some embodiments of the present system takes advantage of optical properties of lens material to create a reflective surface without reflective or special coating(s). The reflected optic camera module may be designed so that the angle of the reflective surface is combined with the optical properties of the lens material to cause total internal reflection without a mirrored surface coating. A complete camera module may be designed based on a targeted or desired user angle, optical path, and/or angle of incidence.

FIG. 2J illustrates an angle of incidence in a system using a reflected optic camera module. A critical angle is the angle of incidence above which total internal reflection occurs (e.g., within glass medium of the reflected optic camera module). The angle of incidence may be measured with respect to the normal at a refractive boundary (e.g., according to Snell's law) or interface. For instance, consider a light ray passing from the glass medium into air. At a small initial angle of incidence, a light ray emanates from the interface and bends towards the glass. When the incident angle is increased sufficiently, the transmitted angle (in air) reaches 90 degrees. It is at this point that no light is transmitted into air. The equation for the critical angle may be represented as:

$$\theta_c = \theta_i = \arcsin\left(\frac{n_2}{n_1}\right),$$

If the incident ray is precisely at the critical angle, the refracted ray is tangent to the boundary at the point of incidence. If for example, visible light were traveling through acrylic glass (with an index of refraction of approximately 1.50 for instance) into air (with an index of refraction assumed to be 1.00), the critical angle for light from acrylic glass into air may be calculated to be:

$$\theta_c = \arcsin\left(\frac{1.00}{1.50}\right) = 41.8°.$$

In this case, light incident on the border with an angle less than 41.8° would be partially transmitted, while light incident on the border at angles larger than 41.8° with respect to normal would be totally internally reflected. In embodiments of the present system using a reflected optic camera module, the angle of incidence is typically greater than 42 degrees. Therefore, total internal reflection can provide a reflective surface without using a mirrored coating. This is illustrated with respect to FIG. 2K, which depicts a system using a reflected optic camera module. Some design parameters of the adjustable reflected optic camera module may be represented in one embodiment as:

IA=(90+RA)−EA or

IA=(90+(UA/2))−UA

IA=90−(UA/2)

As an example, for a user angle of 45 degrees relative to the vertical:

IA=90−(45/2)=67.5 degrees

According to the above design parameters, for any reasonable user angle (e.g., 90 degrees or less), the IA would be greater than 42 degrees and total internal reflection can be assured for interfaces between media having a ratio of indices of refraction similar to that of acrylic glass and air. For instance, instead of acrylic glass, another medium of a similar refractive index may be used. In some embodiments, another medium of a different refractive index (e.g., 1.2, 1.3, 1.4, 1.6, 1.7, 1.8, etc.) may be used as long as the angle(s) of incidence in a given context or application is expected or restricted to result in total internal reflection. In some embodiments, the reflective optic camera module design of the present system leverages on lens materials (e.g., that are moldable and/or machine-able) and/or precision manufacturing to create a complete reflective optic lens as a solid piece of molded acrylic glass (or other material).

Figure 2M:
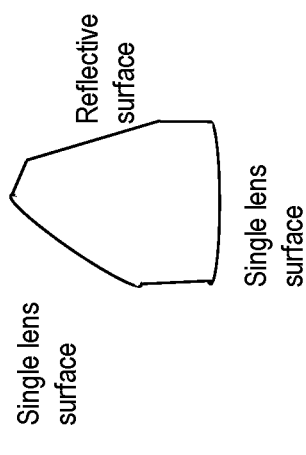
FIGS. 2L and 2M illustrate a reflected optics camera module.
Figure 2L:
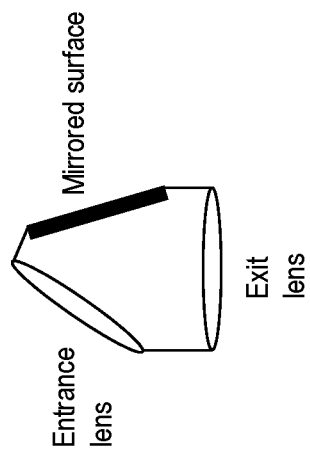

For instance, FIG. 2L illustrates one embodiment of a reflected optics camera module. In this illustrative embodiment, components of the reflected optic lens assembly are shown, including an entrance lens, an exit lens and a mirrored surface. The mirrored surface is used in this embodiment instead of using total internal reflection.

FIG. 2M illustrates another embodiment of a reflected optics camera module. In this illustrative embodiment, components of the reflected optics lens assembly are molded as a solid piece of acrylic glass for example. This contrasts with the use of two or more separate components as shown in FIG. 2L. The optical angle of the reflected optics camera module may be adjusted during manufacturing to match or meet the requirements of the computing device (e.g., for total internal reflection to occur).

FIGS. 2N and 2O illustrate embodiments of a reflected optics camera module. As shown, the reflected optics camera module includes an entrance lens, an image sensor, and a module case for holding or containing the lens and sensor. A representation of electrical contacts are shown on the bottom of the camera module for mounting or connecting to a circuit board or other portion of a computing device. FIG. 2N depicts a cross sectional view of an embodiment of the camera module showing a reflective optic lens, an image sensor, and a case. FIG. 2O depicts a different view of one embodiment of the camera module. Although illustrated as a solid piece of molded acrylic glass or other material in the shape and form shown in the various figures, other shapes and/or form are contemplated. For example, some embodiments of the reflected optics camera module may not be partially cylindrical in form. In certain embodiments, the reflected optics camera module may have a flat or curved entrance surface, which may be of a circular, oval, rectangular or other shape. In some embodiments, the reflected optics camera module may have a flat or curved exit surface, which may be of a circular, oval, rectangular or other shape. In some embodiments, the reflective surface may be flat or curved, and/or of a circular, oval, rectangular or other shape. In certain embodiments, the material/medium may comprise regions having different refractive indices. In some embodiments, the material/medium may comprise two or more sections (e.g., fabricated separately) and fused or assembled together.

Embodiments of the present solution differ from camera modules that bend the optical path inside the camera lens to capture images of objects at 90 degrees relative to the image sensor. Such 90 degree camera modules can only capture images of objects at 90 degrees to the laptop for example. Such 90 degree camera modules have a limited purpose—to make the camera module smaller in one dimension. For example, a 90 degree camera module made with a 3 mm width image sensor with a 5 mm focal length lens using typical optics can be 7 mm in vertical length (lens length (5 mm)+image sensor thickness (~1 mm)+camera module case thickness (~1 mm)). A 5 mm focal length camera with reflected optics can be 4 mm in length (image sensor width (3 mm)+camera module case thickness (~1 mm)) due to the optical path being folded at a 90 degree angle inside the lens. Thus, such folded optics are only for space saving. The folded optic reduces the camera height from mainly the lens length to mainly the image sensor width, which only solves the issue of compactness—there is no need or expectation for adjustment of the optical angle such as to effectively acquire iris biometric information based on the expected posture or orientation of a user relative to a computing device for biometric recognition purposes.

Moreover, depending on the lens material used, other systems require a reflective coating. Depending on the lens material used, total internal reflection is not guaranteed at the 45 degree angle of incidence at the reflector. In addition, efficiency of light reflectance may be reduced at the critical angle. One or more embodiments of the present systems and methods address a very different problem from other systems, for example, how to capture images of a user's eyes for iris recognition while overcoming five major issues: 1) aiming the camera at an angle different from the module mounting angle, 2) how to set the angle during manufacturing, 3) how to accommodate a wide range of angles so that each computing device product has the best camera angle, 4) how to make a monolithic reflective optic lens of one piece with adjustable optical angle, and 5) how to create the reflected surface without the added cost of reflective coatings. In products where a few cents in manufacturing costs determines the success of a product, embodiments of the present systems and methods can bring the security of iris recognition into wide use.

Figure 2P:
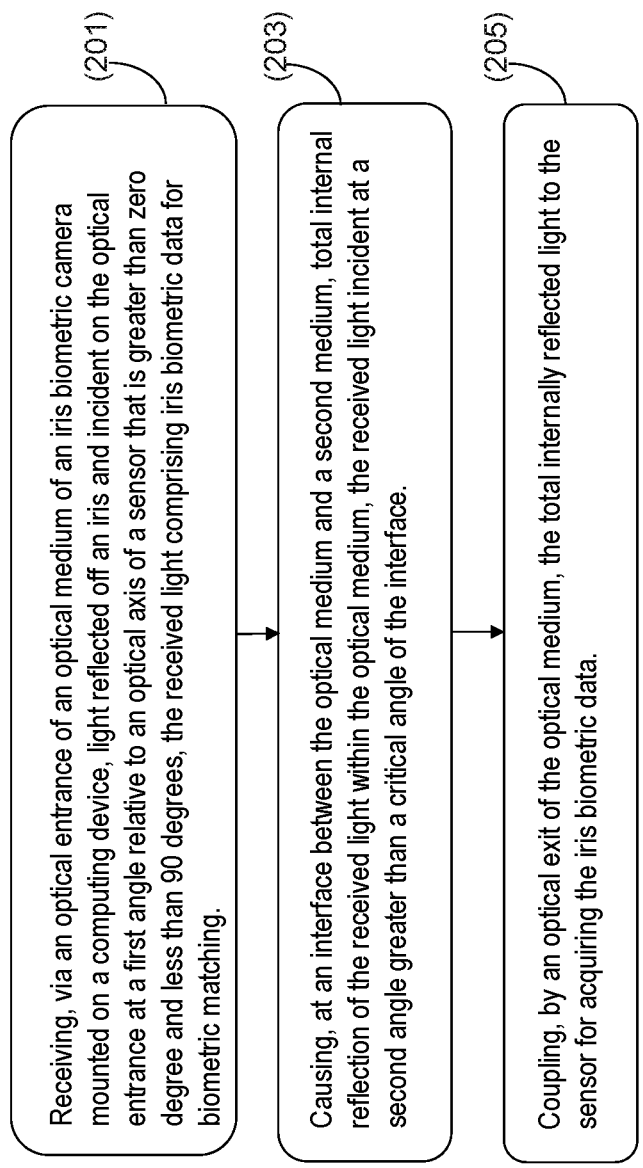
FIG. 2P is a flow diagram illustrating a method for acquiring biometric data from an iris oriented at an angle to a computing device, according to some embodiments.

Referring now to FIG. 2P, one embodiment of a method for acquiring biometric data from an iris oriented at an angle to a computing device is depicted. The method can include receiving, via an optical entrance of an optical medium of an iris biometric camera mounted on a computing device, light reflected off an iris and incident on the optical entrance at a first angle relative to an optical axis of a sensor that is greater than zero degree and less than 90 degrees (201). The received light may include iris biometric data for biometric matching. An interface between the optical medium and a second medium may cause total internal reflection of the received light within the optical medium (203). The received light may be incident at a second angle greater than a critical angle of the interface. An optical exit of the optical medium may couple the total internally reflected ray to the sensor for acquiring the iris biometric data (205).

Referring now to 201, and in some embodiments, an optical entrance of an optical medium of an iris biometric camera mounted on a computing device may receive light reflected off an iris and incident on the optical entrance at a first angle relative to an optical axis of a sensor that is greater than zero degree and less than 90 degrees (e.g., at 45 or 60 degrees relative to the optical axis which may be pointing outwards and vertically upwards from the sensor). For instance, the optical entrance may receive a ray incident on the optical entrance, the ray comprising biometric data of a subject. The optical entrance may comprise an optical lens, which may be a separate component of a reflected optic camera module (or iris biometric camera), or part of a monolithic piece of material corresponding to the optical medium which may be part of a camera module (or iris biometric camera). In some embodiments, the incident ray comprises light reflected from a face and/or eye of the subject facing or located in front of the optical entrance. The subject may be expected to be gazing in a general direction that is pointing directly towards the optical entrance, e.g., in a direction perpendicular to a primary plane of the optical entrance, or along an optical axis of the optical entrance. For instance, the ray may comprise light reflected from an iris of the subject, which is to be acquired or captured by a camera module that includes the optical medium. In some embodiments, the light reflected from the iris comprises biometric data that is to be used for biometric recognition, verification or matching, e.g., in authenticating the subject and/or providing access control for the subject.

The camera module may be integrated or mounted on a computing device, and the computing device may be used or operated by the subject. The optical entrance of the camera module may be configured to be directed along an angle towards which the face or eye of the subject is expected to be facing, positioned and/or exposed. The optical entrance may be oriented or positioned to face towards an expected gaze direction of the subject using the computing device. The sensor may be mounted on a circuit board of the computing device and oriented away from the expected gaze direction. For instance, the iris biometric camera may be integrated with or mounted to a keyboard or an input pad of the computing device (e.g., a laptop placed on a table). By way of illustrations, the subject may be facing or gazing towards a screen of the computing device or at the keyboard, e.g., at an angle to a major plane (and circuit board) of the keyboard. The sensor may be mounted to the circuit board and have an optical axis that is perpendicular to the circuit board (e.g., pointing vertically upwards), and would not have optimally received the incident light to image the iris. Mounting the sensor at an angle relative to the circuit board or major plane of the computing device may be challenging or not possible.

Thus, some embodiments of the present system and methods use the optical entrance, which may be offset at an angle relative to the optical axis of the sensor, and oriented towards an expected gaze direction of the subject, to receive and channel the incident light. The optical entrance may be positioned, angled and/or shaped to be oriented towards an expected gaze direction of a subject using the computing device.

In some embodiments, the ray incident on the optical entrance enters the optical entrance without substantially altering its angle of incidence. For example, any change in the optical path after entering the optical medium may be less than a predefined angle, such as 1 degree, 3 degrees, 5 degrees, 10 degrees, etc. In certain embodiments, the optical entrance is configured to direct the incident ray to the interface, a reflective surface or a prism of the optical medium. The optical entrance may be oriented, shaped and/or positioned to allow the incident ray to transmit or be conveyed directly onto the interface. In some embodiments, the optical medium may correspond to a monolithic piece of material (e.g., acrylic glass) with a predetermined or uniform refractive index, and the second medium may comprise air or a vacuum, e.g., around at least part of the optical medium. At least one of the optical entrance or the optical exit may incorporate a lens structure. In some embodiments, at least one of the optical entrance or the optical exit may comprise an optical lens.

Referring now to 203, and in some embodiments, an interface between the optical medium and a second medium may cause total internal reflection of the received light within the optical medium. The received light may be incident at a second angle greater than a critical angle of the interface. The interface of the optical medium with a second medium may receive the received ray at a first angle greater than a critical angle of the interface to enable total internal reflection of the received incident ray. For instance, a plane of the interface may be at an angle of less than 45 degrees relative to the optical axis of the sensor. The interface may operate or serve as a reflective surface of the optical medium. In some embodiments, a reflective or mirrored coating is used in place of the interface to reflect the received ray. In certain embodiments, a prism, lens or other optical structure or configuration, or any combination thereof, is used in place of the interface to redirect the received ray or bend the optical path of the received ray. For instance, the optical medium may be replaced with one or more of an optical entrance lens, redirection optics (e.g., prism, lens and/or reflective mirror surface) and/or an optical exit lens. The redirection optics of the iris biometric camera may be configured to alter the path of the received light towards the sensor, e.g., via reflection and/or refraction. The redirection optics may incorporate at least one of a reflecting surface or a prism.

In some embodiments, the interface is configured or designed to perform total internal reflection of the received incident ray, according to the expected or possible angle(s) of the ray incident on the optical entrance. For instance, one or both refractive indices of the optical medium and/or the second medium may be selected so that the ray incident on the interface exceeds the critical angle. The optical medium and/or the second medium may be selected so that the ray incident on the interface exceeds the critical angle. In some embodiments, the second medium comprises air, and the optical medium may comprise acrylic glass or another appropriate material. The interface may bend, modify or change the optical path of the ray so that the ray is directed or reflected towards the optical exit and/or the sensor. The interface may configured or designed to perform total internal reflection of the received incident ray, so as to modify the optical path without using reflective or mirrored coatings.

Referring now to 205, and in some embodiments, an optical exit of the optical medium may couple the total internally reflected ray to a sensor for acquiring the biometric data from the total internally reflected ray. The optical exit of the optical medium may couple the light/ray from the interface or redirection optics, to the sensor. The ray may be incident on the optical entrance at a second angle relative to an optical axis (or main axis) of the sensor that is less than 90 degrees. For example, the second angle may be 30, 35, 40, 45, 50, 55 or 60 degrees. The optical exit may receive the ray which is total internally reflected from the interface. The optical exit may direct, guide or couple the ray to the sensor. The optical exit may allow the ray to pass or transmit through to the sensor. The optical exit may direct the ray to be incident on the sensor along or substantially along an optical axis of the sensor. The sensor may acquire or capture information from the ray, such as the biometric data from the subject. The biometric data may be extracted, processed and/or stored in a memory, and may be communicated to a processor. The processor may perform biometric matching and/or recognition on the biometric data, to authenticate the subject and/or perform access control (e.g., for authorization of a transaction or authorization to use the computing device).

It should be noted that certain passages of this disclosure can reference terms such as "first" and "second" in connection with devices, RATs, communication protocols, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for acquiring biometric data from an iris oriented at an angle to a computing device, the system comprising:
   a sensor of an iris biometric camera mounted on a computing device;
   an optical entrance of an optical medium of the iris biometric camera, the optical entrance configured to receive light reflected off an iris and incident on the optical entrance at a first angle relative to an optical axis of the sensor that is greater than zero degrees and less than 90 degrees, the received light comprising iris biometric data for biometric matching;
   an interface between the optical medium and a second medium, the interface configured so that the received light undergoes only a single reflection within the optical medium, the single reflection being a total internal reflection of the received light within the optical medium at the interface, and the received light is incident at a second angle greater than a critical angle of the interface to cause the total internal reflection of the received light within the optical medium; and
   an optical exit of the optical medium, the optical exit configured to couple the total internally reflected light to the sensor for acquiring the iris biometric data.

2. The system of claim 1, wherein the optical entrance is oriented towards an expected gaze direction of a subject using the computing device, and the sensor is mounted on a circuit board of the computing device and oriented away from the expected gaze direction.

3. The system of claim 1, wherein the iris biometric camera is integrated with a keyboard or an input pad of the computing device.

4. The system of claim 1, wherein the optical medium corresponds to a monolithic piece of material with a predetermined refractive index.

5. The system of claim 1, wherein the second medium comprises air or a vacuum.

6. The system of claim 1, wherein a plane of the interface is at an angle of less than 45 degrees relative to the optical axis of the sensor.

7. The system of claim 1, wherein at least one of the optical entrance or the optical exit incorporates a lens structure.

8. The system of claim 1, wherein the sensor is configured to acquire the iris biometric data for biometric matching to provide access control to a corresponding subject.

9. A method for acquiring biometric data from an iris oriented at an angle to a computing device, the method comprising:
   receiving, via an optical entrance of an optical medium of an iris biometric camera mounted on a computing device, light reflected off an iris and incident on the optical entrance at a first angle relative to an optical axis of a sensor that is greater than zero degrees and less than 90 degrees, the received light comprising iris biometric data for biometric matching;
   causing only a single reflection within the optical medium, the single reflection being a total internal reflection of the received light within the optical medium at an interface between the optical medium and a second medium, the received light incident at a second angle greater than a critical angle of the interface; and
   coupling, by an optical exit of the optical medium, the total internally reflected light to the sensor for acquiring the iris biometric data.

10. The method of claim 9, comprising positioning the optical entrance to be oriented towards an expected gaze direction of a subject using the computing device, wherein the sensor is oriented away from the expected gaze direction.

11. The method of claim 9, wherein the iris biometric camera is integrated with a keyboard or an input pad of the computing device.

12. The method of claim 9, wherein the optical medium corresponds to a monolithic piece of material with a predetermined refractive index, and the second medium comprises air or a vacuum.

13. The method of claim 9, wherein a plane of the interface is at an angle of less than 45 degrees relative to the optical axis of the sensor.

14. The method of claim 9, further comprising acquiring, by the sensor, the iris biometric data for biometric matching to provide access control to a corresponding subject.

15. A system for acquiring biometric data from an iris oriented at an angle to a computing device, the system comprising:
   a sensor of an iris biometric camera mounted on a computing device;
   an optical entrance of an iris biometric camera, the optical entrance configured to receive light reflected off an iris and incident on the optical entrance at an angle relative to an optical axis of the sensor that is greater than zero degrees and less than 90 degrees, the received light comprising iris biometric data for biometric matching;
   redirection optics of the iris biometric camera configured to alter the path of the received light towards the sensor via only a single reflection within an optical medium, the single reflection being a total internal reflection of the received light within the optical medium at an interface between the optical medium and a second medium, the received light incident at a second angle greater than a critical angle of the interface; and
   an optical exit of the iris biometric camera, the optical exit configured to couple the light corresponding to the total internal reflection of the received light, from the redirection optics to the sensor for acquiring the iris biometric data.

16. The system of claim 15, wherein the optical entrance is oriented towards an expected gaze direction of a subject using the computing device, and the sensor is mounted in the computing device and oriented away from the expected gaze direction.

17. The system of claim 15, wherein the iris biometric camera is integrated with a keyboard or an input pad of the computing device.

18. The system of claim 15, wherein the redirection optics incorporate at least one of a reflecting surface or a prism.

19. The system of claim 15, wherein at least one of the optical entrance or the optical exit comprises a lens.

20. The system of claim 15, wherein the sensor is configured to acquire the iris biometric data for biometric matching to provide access control to a corresponding subject.

* * * * *